March 1, 1949.  K. S. WYATT  2,463,231
METHOD OF MAKING CABLE JOINTS
Filed April 24, 1945
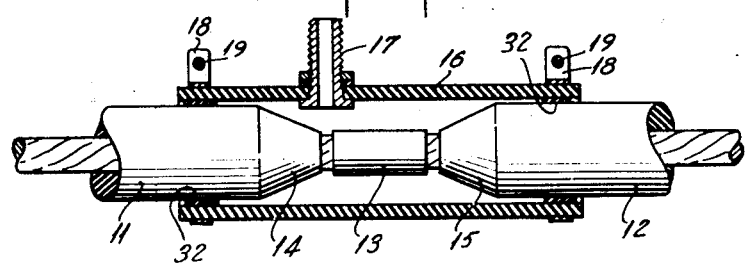
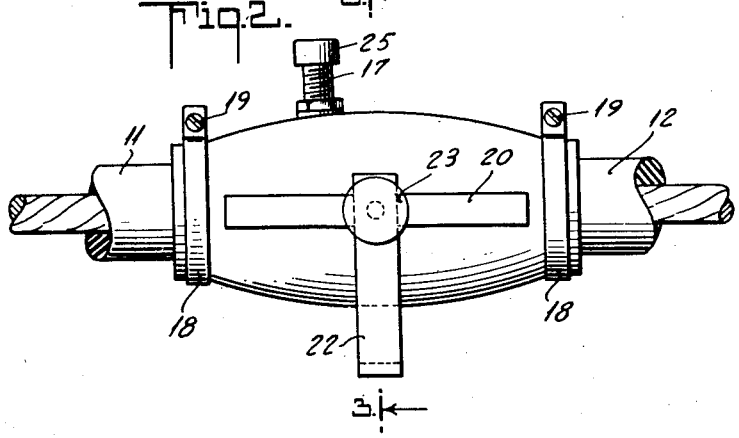
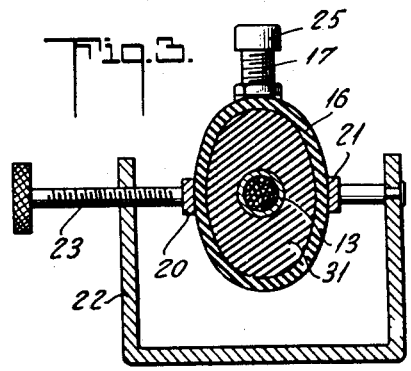
INVENTOR
KENNETH SAPWELL WYATT
BY
ATTORNEY Patented Mar. 1, 1949

2,463,231

UNITED STATES PATENT OFFICE 2,463,231

METHOD OF MAKING CABLE JOINTS

Kenneth Sapwell Wyatt, Bronxville, N. Y., assignor to Phelps Dodge Copper Products Corporation, Dover, Del., a corporation of Delaware Application April 24, 1945, Serial No. 590,062

4 Claims. (Cl. 154—2.22)

This invention relates to high tension electric cables, more particularly to joints for such cables in which the insulation is extruded upon the conductor and has for its object the production of a structure that will eliminate the voids that form within the insulation of the joint during the cooling period following the hot extrusion process and to suppress cavity formation and subsequent gaseous ionization.

The object of my invention is to produce a method of making a joint in plastic insulated cables either for electric power, or for communication purposes, in a simple quick manner, which will eliminate with certainty gas bubbles or voids, and which will insure completely satisfactory bonding of the joint insulation to the cable insulation. My method consists briefly in sliding over the joint an elastic radially distensible tubular mold, the insulation of the two cables to be joined having been pencilled and the connector applied to the conductor ends in the usual manner, and the temperature of the conductor raised to a value at which the resin flows under the pressure employed; extruding into the space between the mold and the conductor by means of a nipple in the mold wall a thermoplastic resin heated sufficiently high for it to flow readily under the jointing conditions and to soften the pencilled cable insulation so that a good bond is effected; the application of pressure, after the mold has been filled with a thermoplastic resin, to force more thermoplastic resin into the nipple so as to radially distend the mold elastically; the removal of the extrusion gun and the capping of the extrusion nipple to prevent the thermoplastic resin from leaking out of the distended mold; and the application of two metal strips on either side of the distended mold parallel with the cable axis, and the bringing toward one another of the two metal strips by means of clamps or otherwise so as to cause the distended mold to assume a shape elliptical in cross section immediately after removal of the extrusion gun and before appreciable cooling has taken place.

Plastic insulated electric cables are finding wider commercial use than heretofore owing to the introduction of new synthetic resin plastics which have desirable new properties and which are economically advantageous, both because they are of low cost themselves and because they may be applied very cheaply to the cable, usually by extrusion, sometimes by strip or tape methods. The advent of this type of cable on a wider scale makes necessary the improvements of joints for such cables.

Both in power and in communication cables it is of the greatest importance that no bubbles or gas films be present within the insulation wall of the cable or joint, or between the insulation and the metallic conductor. In the case of power cables the electric stress may cause ionization in such gas bubbles or films which in turn will lead to breakdown of the cable. In the case of certain types of radar cable the presence of such gas pockets results in variable velocity of propagation and an increase in attenuation.

It is also important in both types of cables that the joint insulation should bond properly to the cable insulation over the whole extent of its pencilled surface.

Unfortunately, joints, as usually made at the present time, do not fulfill the requirements stated of bubble-free or void-free insulation on the one hand, and of a complete union or bond between the joint insulation and the cable insulation on the other hand. Where such joints are made successfully, it is only by taking excessive pains and employing a long drawn-out process of making the joints. Even then some joints must be rejected, and it is still not practicable to make large numbers of joints with complete confidence that all of them will be satisfactory.

Plastic joints are usually made by placing a mold around the two cables whose ends have been joined by a connector and the insulation pencilled, heating the mold, and extruding in through a port in the mold a hot fluid thermoplastic resin and allowing to cool slowly. Another method has been to apply tape, made of the same synthetic resin as the cable insulation, over the connector and build up the insulation at the joint to a thickness as great as the cable insulation or more; then a mold is applied around this insulation and the mold heated, the two halves of the mold being pressed together so as to compress the tape insulation at the same time as heating it, thus forming it into a homogenous joint insulation.

The foregoing and other features of my invention will now be described in connection with the accompanying drawing forming part of this specification in which I have represented my cable joint in its preferred form, after which I shall point out in the claims those features which I believe to be new and of my own invention.

Figure 1 is a longitudinal view illustrating the method of making my joint with the mold before distention in section.

Figure 2 is a longitudinal view thereof showing the outside of the mold in distended position.

Figure 3 is a section along the line 3—3, Figure 2.

In the carrying out of my invention two ends 11 and 12 of cables to be joined are brought together and fastened with a connector 13 which may be formed by compression on the conductor ends or otherwise secured by means of high melting point solder. The insulation having been pencilled as shown at 14 and 15, an elastic distensible mold 16 is positioned over the joint which may be made of rubber fabric or pressure hose. In the wall of the mold 16 I provide a nipple 17 through which I extrude the material 31 used for my joint.

Over the insulation, just back of the pencilling, I provide plastic tape or rubber filler 32 to completely fill the space between the insulation 11 and the inside of the mold 16. Over the outside ends of the mold 16 I provide clamps 18 which when tightened by means of the screws 19 securely hold the mold in place over the joint, and tightly to the insulation of the cable.

The plastic used for the joint is extruded through the nipple 17 until the mold is distended radially, as shown in Figure 2, sufficiently to exert a substantial pressure on the joint throughout its cooling.

After the mold is distended as shown in Figure 2, the extrusion is stopped and the nipple 17 is capped with a tight closure cap 25.

Before any extensive cooling takes place, I place two metal strips 20—21, one on either side of the distended mold section, as shown in Figures 2 and 3, and by means of a clamp 22 pressure is exerted to shape the distended mold in elliptical cross section as shown in Figure 3, the extruded resin 31 filling the mold section. The tightening of the clamp 22 by means of the screws 23 is done during cooling.

After the joint has solidified it is generally desirable to remove the distensible mold 16. Where this consists of a rubber-fabric composition this may be readily accomplished by making a knife-cut in a longitudinal direction and peeling it off. Any roughness of the insulation may then be smoothed off; in the case of polyethylene this may readily be done with a spokeshave.

This improved method of jointing is especially efficacious where the resin extruded around the joint has a high coefficient of contraction, making shrinkage problems especially troublesome. An example of such a resin is polyethylene, with which the method is highly satisfactory where other methods fail.

With polyethylene cable it is found desirable to heat the conductor to temperatures as high as 150° C. Since in attaining this temperature the solder usually employed for this purpose may drop out of the connector, it is desirable in using this process to use a high melting point solder or to employ a compression connector. The latter precautions are particularly desirable for large-size conductors, such as one-half million circular mils.

The temperature to which the conductor is preheated depends on the softening and flow characteristics of the insulation of the cable, and on those of the joint insulation in cases where the extruded joint insulation is of different composition from that of the cable insulation. In general, the conductor should be heated as far as possible above the softening point of the cable insulation, but not so high as to cause the insulation to flow and drip out, nor to cause decomposition of the plastic. The conductor temperature must be sufficiently above the softening point of the joint insulation that it does not chill and solidify the latter during extrusion.

It is important immediately after removal of the extrusion gun and before appreciable cooling has taken place to cause the mold to assume a shape elliptical in cross section. This may be simply done by applying two steel strips 20 and 21 on either side of the tubular mold in the same direction as the cable axis, and drawing them together by clamps 22 or other means as heretofore described.

This method may also be used to advantage where the mold is flexible but not substantially elastic, the joint insulation being maintained under pressure during cooling by applying pressure continuously throughout this period on the two flat strips which cause the mold to assume an elliptical shape. This is based on the fact that as a tube of circular cross-section is collapsed to an elliptical cross-section, the internal volume contained by the tube becomes smaller as the ellipse becomes flatter, assuming that the periphery of the tube remains essentially constant. For example, a lead sleeve may be used in place of an elastic mold, but the compressive forces on the joint insulation during cooling must be supplied, instead of by the elasticity of the distended mold, by spring loaded clamps or equivalent acting on two metal strips on either side of the joint and parallel to its axis so as to continuously compress the mold into a shape elliptical in cross-section, the pressure on the strips tending to make the ellipse flatter.

The reason for my making the mold elliptical in cross section is to avoid the disadvantage of the circular shape for when the circular cross section cools, a thin shell of semi-rigid material forms on the outside which will not collapse as the semi-fluid material at its axis cools or shrinks, and so gas bubbles or voids are formed. However, if the tubular cross section be made elliptical, then after the outer semi-rigid shell is formed, the subsequent cooling and shrinkage of the material near the axis is accommodated by elliptical collapse, particularly if aided by an external pressure directed inwardly.

The heating of the conductor may be accomplished by an electrical resistance heater thermostatically controlled; by a flame; or by induction heating. In any case, the heating should be prolonged sufficiently for a short length of the conductor on either side of the joint to be heated up.

It is important, in employing this method, to make provision for escape of air within the tubular mold at the time the hot thermoplastic material is injected into it. This may be accomplished by leaving the elastic tubular mold loose around the cable insulation at either end until just before the high pressure is applied to the thermoplastic causing the mold to distend, at which time the clamp at either end should be made tight so as to hold the mold in place to better withstand the high pressure.

The mold may be conveniently made of a length of composition rubber fabric hose of a slightly larger diameter than that of the cable insulation, and suitable for withstanding the pressures and temperatures experienced during extrusion. The space between the ends of the rubber tube and the cable insulation may be built up with a synthetic resin tape of the same material as the cable insulation.

The use of the elliptical feature may not be necessary for small joints where it is not important that the joint insulation be strictly free from minute bubbles or voids.

For jointing polyethylene cable we employ polyethylene insulation at the joint. It is extruded into the mold nipple at temperatures as high as 190 to 200° C. It is desirable to complete the extrusion within a minute or so after the gun has been applied to the extrusion nipple, and not later than two minutes after the means for heating the conductor have been removed. The pressures on the thermoplastic within the mold will depend on the size of the joint and the strength of the constructions which have a substantially elliptical shape. For example, a cross section which is rectangular, with semi-circular ends would come within the scope of our invention.

I wish it distinctly understood that my improved cable system herein illustrated and described is in the form in which I desire to construct it and that changes or variations may be made as might be convenient or desirable without departing from the salient features of my invention and I, therefore, intend the following claims to cover such modifications as naturally fall within the lines of invention.

I claim:

1. The method of making a joint in cables having a resin insulation comprising the steps of pencilling the insulation at the ends of the cable to be spliced, joining the ends of the conductor by a suitable connector, sliding over the joint an elastic distensible tubular mold, heating the conductor to a value at which the resin flows under the pressure employed, extruding into the mold a thermoplastic resin at a temperature for it to freely flow and fill the mold, forcing more resin into the mold chamber until the wall thereof has been distended radially sufficiently to exert a substantial continuing pressure in the joint throughout contraction of the thermoplastic resin, applying pressure on either side of the mold parallel to the longitudinal axis to cause the mold to assume an elliptical shape in cross-section immediately after the extrusion has been completed, and prior to appreciable cooling taking place.

2. The method of making a joint in cables having a resin insulation comprising the steps of pencilling the insulation at the ends of the cable to be spliced, joining the ends of the conductor by a suitable connector, sliding over the joint an elastic distensible tubular mold, heating the conductor to a value at which the resin flows under the pressure employed, extruding into the mold a thermoplastic resin at a temperature for it to freely flow and fill the mold, forcing more resin into the mold chamber until the wall thereof has been distended sufficiently to exert a substantial pressure on the joint throughout its cooling.

3. A method of making a joint in cables having a thermosetting or thermoplastic insulation comprising the steps of pencilling the ends of the insulation exposing the conductor ends, joining the ends of the conductor, extruding material substantially similar to the insulation over the joint, filling the space between the pencilled ends until the material filling the said space is substantially larger in diameter than the diameter of the insulation of the cable, exerting a continuing substantial pressure radially to compress the joint material during the entire contraction of the cooling material.

4. A method of making a joint in cables comprising the steps of pencilling the insulation at the ends of the cable to be spliced, joining the ends of the conductor by a suitable connector, sliding over the joint a flexible metal sleeve, heating the conductor to a value suitable for the resin of the insulation, extruding into the mold a thermoplastic resin at a temperature for it to freely flow and fill the mold, applying pressure on either side of the mold parallel to the longitudinal axis to cause the mold to assume an elliptical shape in cross-section immediately after the extrusion has been completed and prior to appreciable cooling taking place, and continuing the application of pressure during cooling, thereby tending to flatten the elliptical cross-section and maintaining the joint insulation under pressure even as it contracts from cooling.

KENNETH SAPWELL WYATT.

REFERENCES CITED

The following references are of record in the file of this patent:

UNITED STATES PATENTS

| Number | Name | Date |
| --- | --- | --- |
| 1,693,365 | Boyle et al | Nov. 27, 1928 |
| 2,016,905 | Nathan et al | Oct. 8, 1935 |
| 2,209,894 | Scott et al | July 30, 1940 |
| 2,256,160 | Britton et al | Sept. 16, 1941 |
| 2,287,163 | Bishop | June 23, 1942 |
| 2,312,652 | Komives et al | Mar. 2, 1943 |